United States Patent [19]
Ochi et al.

[11] Patent Number: 6,094,613
[45] Date of Patent: Jul. 25, 2000

[54] CONTROL APPARATUS AND A CONTROL METHOD FOR CONTROLLING AN AUTOMATIC TRANSMISSION OF A VEHICLE

[75] Inventors: Tatsuya Ochi, Hitachi; Toshimichi Minowa, Mito, both of Japan

[73] Assignee: Hitachi, Ltd., Tokyo, Japan

[21] Appl. No.: 08/840,856

[22] Filed: Apr. 17, 1997

[30] Foreign Application Priority Data

Apr. 19, 1996 [JP] Japan .................................. 8-097978

[51] Int. Cl.⁷ .............................. F16H 61/06; F16H 59/00
[52] U.S. Cl. .................................. 701/66; 701/60; 477/34
[58] Field of Search ................................ 701/51, 55, 58, 701/60, 66; 477/34

[56] References Cited

U.S. PATENT DOCUMENTS

| | | | |
|---|---|---|---|
| 4,868,753 | 9/1989 | Mori | 364/424.1 |
| 5,109,967 | 5/1992 | Saitou et al. | 192/0.076 |
| 5,188,005 | 2/1993 | Sankpal et al. | 74/866 |
| 5,292,288 | 3/1994 | Kashiwabara et al. | 474/63 |
| 5,462,499 | 10/1995 | Bullmer et al. | 477/120 |
| 5,752,210 | 5/1998 | Kato et al. | 701/51 |

FOREIGN PATENT DOCUMENTS

| | | |
|---|---|---|
| 0 588 627 A1 | 3/1994 | European Pat. Off. . |
| 5-87227 | 4/1993 | Japan . |
| 5-164236 | 6/1993 | Japan . |
| 5-296332 | 11/1993 | Japan . |
| 6-74327 | 3/1994 | Japan . |
| 7-293682 | 11/1995 | Japan . |

*Primary Examiner*—Michael J. Zanelli
*Attorney, Agent, or Firm*—Evenson, McKeown, Edwards & Lenahan, P.L.L.C.

[57] ABSTRACT

A detector is provided to detect the inertia phase at the time of shifting in a vehicle automatic transmission. A torque variation coefficient calculator calculates varying rate of the torque variation, while a memory stores a constant value of the torque variation. A comparator compares the coefficient of the torque variation with the constant value, and command generator outputs commands for operating the transmission on the basis of the result of the comparison. Therefore, torque fluctuations at the time of shifting are decreased.

4 Claims, 9 Drawing Sheets

CONTROL APPARATUS AND A CONTROL METHOD FOR CONTROLLING AN AUTOMATIC TRANSMISSION OF A VEHICLE

FIELD OF THE INVENTION

The present invention relates to a control apparatus and a control method for controlling an automatic transmission of the vehicle.

BACKGROUND OF THE INVENTION

Japanese Patent Publication No. 1994/341527 shows a control method in which the period of time from the start of the torque phase to the inertia phase is detected at the time of shifting up and it is determined that a change with time exists in the friction engagement devices when the period of time has varied from a set value. The hydraulic pressures supplied to the two friction engagement devices are controlled so that overlapping of the torques born by the friction engagement device on the disengaging side and the friction engagement device on the engaging side is corrected. The torque phase is defined as a period during which the torque alone is varied while the engine speed remains unchanged at the start of shifting, for example, from second to third (hereinafter called 2-to-3 shifting), as indicated by temporal variations of a Gf signal (to be described later) in FIG. 2. Further, the period following the torque phase is called an inertia phase, in which the clutch inside the transmission starts to be engaged and the engine speed drops accordingly.

In another conventional method, such as the one disclosed in the gazette of Japanese Patent Laid-open No. Hei 6-341527, when it is attempted to detect the period of time from the start of the torque phase to the inertia phase at the time of shifting up in order to detect existence of a change with time in the friction engagement devices, it becomes necessary to store in memory the temporal data, which are required for detecting the change with time, for each of shifting, such as 1-to-2 shifting and 2-to-3 shifting and, further, for each of throttle openings. Therefore, there is a problem with such a method that the capacity of the ROM (Read Only Memory) of the microcomputer increases.

SUMMARY OF THE INVENTION

An object of the present invention is to provide an apparatus for and a method of controlling a transmission whereby a change with time in the friction engagement devices can be detected by a simple method, an increase in the capacity of the ROM of the microcomputer can be avoided, and fluctuations in the torque can be suppressed even when a change with time has occurred in the friction engagement devices so that comfortable feeling of acceleration can be obtained continuously.

To achieve the above described object, the present invention comprises inertia phase detection apparatus for detecting the start of an inertia phase, which is a period, during which the engine speed varies, in a speed changing period, torque variation detector for detecting a torque variation in the detected inertia phase, coefficient of torque variation calculator for calculating a coefficient of the torque variation detected by the torque variation detector, constant storage apparatus for storing a predetermined constant, comparator for comparing the value of the coefficient of variation obtained in the coefficient of torque variation detector with the value stored in the constant storage apparatus thereby determining whether or not the friction engagement devices are in a state changed with time, and pressure control command generator for outputting, when the devices are in the state changed with time, a pressure control command which is supplied to the friction engagement devices to vary the hydraulic pressures.

DETAILED DESCRIPTION OF THE PREFERRED EMBODIMENTS

Figure 1:
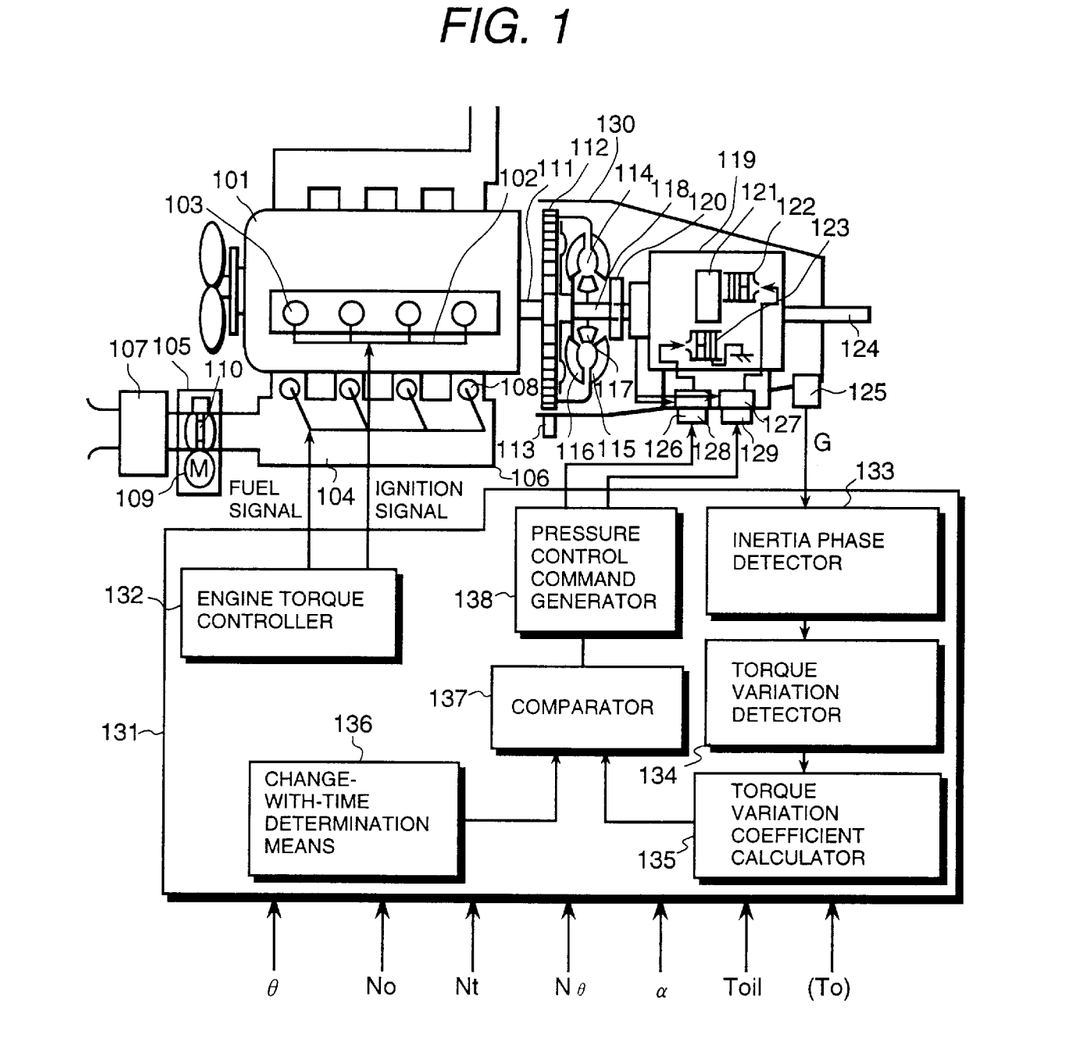
FIG. 1 is a system block diagram of a first embodiment of the present invention.

Referring to FIG. 1, an engine 101 is a four-cylinder engine in this first embodiment. The engine 101 is equipped with an ignition device 102. The ignition device 102 has four ignition plugs 103 corresponding to the number of the cylinders of the engine 101. An intake pipe 104 for taking air into the engine 101 has an electronically controlled throttle 105 for regulating the air flowing therethrough, a fuel injection device 106 for injecting the fuel, and an air flow meter 107. The fuel injection device 106 has four fuel injection valves 108 corresponding to the number of the cylinders of the engine 101. The electronically controlled throttle 105 causes an actuator 109 to drive a throttle valve 110 for controlling the air flow. In a convention of vehicle, the throttle valve 110 is connected with an accelerator pedal (not shown) by a mechanical wire (not shown) so that the two members operate in an interlocked manner.

A crank shaft ill of the engine 101 is furnished with a flywheel 112. The flywheel 112 has an engine speed sensor 113 for detecting revolutions of the crank shaft 111, i.e., an engine speed Ne. A torque converter 114 directly coupled with the flywheel 112 comprises a pump 115, a turbine 116, and a stator 117. The output shaft of the turbine 116, i.e., a torque converter output shaft 118, is directly coupled with a stepped transmission mechanism 119. The torque converter output shaft 118 is equipped with a turbine speed sensor 120 for measuring a turbine speed Nt. The transmission mechanism 119 comprises a planetary gear 121 and friction engagement devices 122, 123. By engagement and disengagement of the friction engagement devices 122, 123, the gear ratio of the gear 121 is changed and the speed is varied. The devices 122, 123 are controlled by spool valves 126, 127 and linear solenoids 128, 129 (pressure governors), respectively. The transmission mechanism 119 is coupled with a drive shaft 124. Vehicle or automatic transmission 130 is equipped with an acceleration sensor 125. The automatic transmission 130 is constituted of the aforesaid components. While the acceleration sensor 125 is used for detecting acceleration in the present embodiment, a drive shaft torque To may be detected in a known way, as an alternative, by the use of a torque sensor (not shown) attached to the drive shaft 124 of the transmission.

Actuators for driving the above described engine 101 and the automatic transmission 130 are controlled by a controller 131. The controller 131 is supplied with such parameters as throttle valve opening θ, transmission output shaft speed No, turbine speed Nt, engine speed Ne, transmission oil temperature Toil, and accelerator pedal angle α for use in the controlling operation.

Incidentally, since the acceleration is obtained from the differential signal of the transmission output shaft speed No, the acceleration sensor 125 may be superseded thereby.

Further, a torque sensor (not shown) may be attached to the drive shaft 124 of the transmission, and the drive shaft torque To of the transmission detected by the torque sensor may be supplied to the controller 131. Because the torque signal has a waveform similar to that of the signal from the acceleration sensor 125, the torque sensor may be used in place of the acceleration sensor 125.

An engine torque controller 132 within the controller 131 outputs control signals to the electronically controlled throttle 105, fuel injection device 106, and the ignition device 102. These control signals are used for suppressing fluctuations in the torque at the time of shifting.

Figure 2:
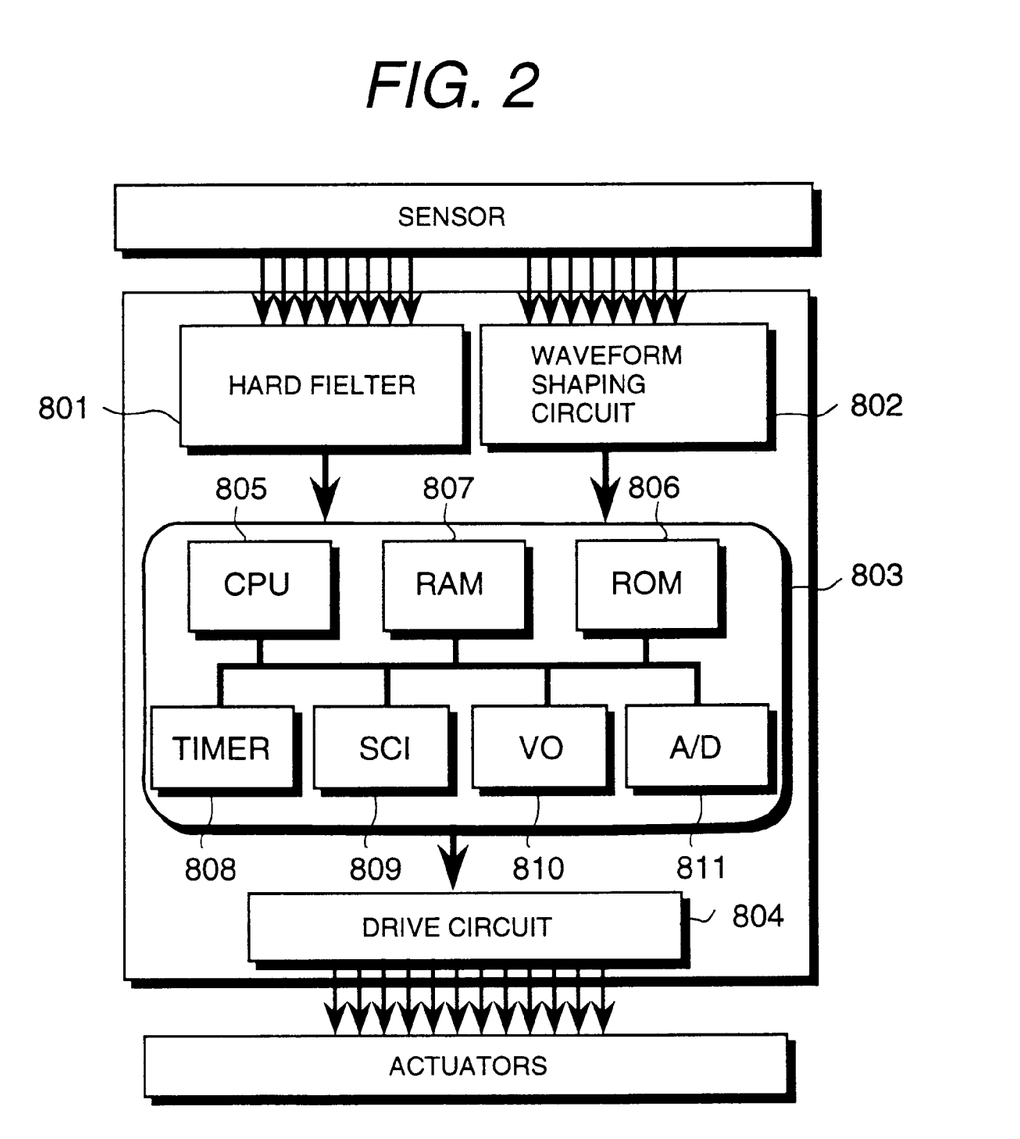
FIG. 2 is a hardware block diagram of a controller.

FIG. 2 is a hardware block diagram of the controller 131 shown in FIG. 1. The controller comprises a filter 801 and a waveform shaping circuit 802 receiving signals from various sensors, a single chip microcomputer 803, and a drive circuit 804 for outputting drive control signals to various actuators such as valves. The microcomputer 803 includes a CPU 805 for performing various calculations, a ROM 806 for storing programs and data to be executed by the CPU 805, a RAM 807 for temporarily storing various data, a timer 808, an SCI (Serial Communication Interface) circuit 809, an I/O circuit 810, and an A/D converter 811. Namely, various functions of the controller 131 are carried out by the CPU 805 performing predetermined calculations based on the programs and data stored in the ROM 806, RAM 807.

As examples of the hardware configurations of the controller 131, the single chip configuration, in which a plurality of single chip microcomputers communicate with each other through a dual-port RAM, and a configuration in which a plurality of single chip microcomputers communicate with each other through a LAN (Local Area Network) can be mentioned.

Referring back to FIG. 1, an inertia phase detector 133 within the controller 131 performs digital processing and filtering processing of an acceleration signal (hereinafter called G signal) so that torque variation detection can be easily performed in a torque variation detector 134. The torque variation detector 134 detects the inertia phase in the shifting operation by using a filtering value Gf of the G signal. As another method, a signal of the drive shaft torque To as differential of the drive shaft speed No may be used.

The filtering processed signal Gf is further differentiated in a torque variation coefficient calculator 135 and thereby the rate of variation of the acceleration is obtained. Because the rate of variation varies around the starting point of the inertia phase detected as described above due to a change with time occurring in the friction engagement devices, it becomes possible to determine the existence of a change with time in the friction engagement devices. In a change-with-time determination apparatus 136, there is stored a constant of reference level obtained through previously conducted experiments for determining the existence of a change with time. The constant is compared with the rate of torque variation obtained by the torque variation coefficient calculator 135 in a comparator 137 and, thereby, it is determined whether or not a change with time exists. In the case where the comparator 137 determines that a change with time exists at the time of shifting up in the direction of the shift ratio becoming smaller such as 2-to-3 shifting, a previously held hydraulic pressure command value (described later) for controlling the hydraulic pressure to be supplied to the friction engagement device on the disengaging side (here, the shifting is assumed to be 2-to-3 shifting) should be lowered so that the friction engagement device on the disengaging side 123 can easily disengage. Then, a pressure control command generator 138 outputs the pressure control command lowered as described above to the linear solenoid 128.

Also at the time of shifting down in the direction of the shift ratio becoming greater such as 3-to-2 shifting, a change with time can be detected by a similar method. In the case of shifting down, however, the engaging and disengaging sides of the friction engagement devices in the case of the shifting up are exchanged.

Figure 3:
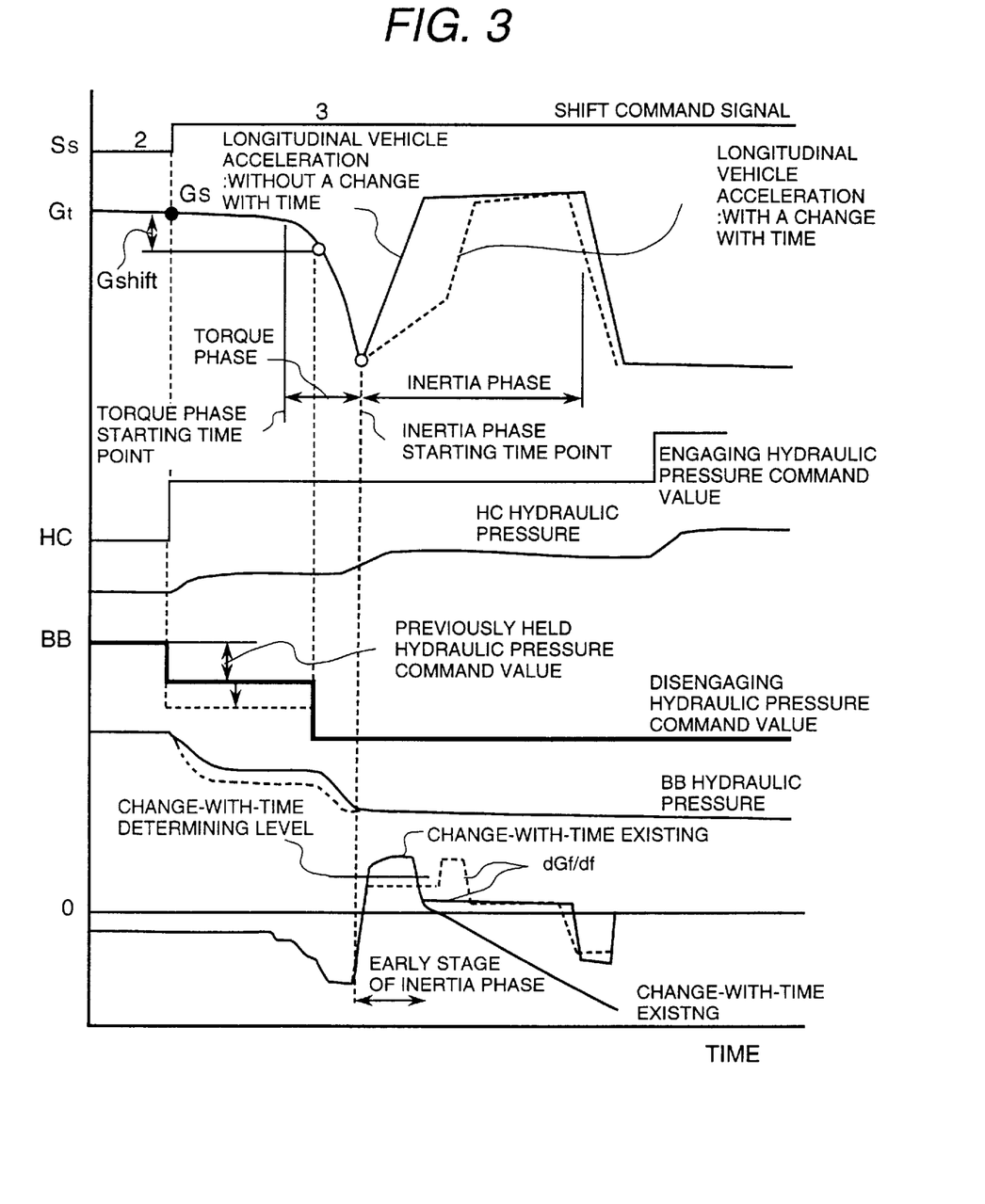
FIG. 3 is a time chart of control to cope with existence of a change with time carried out at the time of upshift control.

FIG. 3 is a time chart of control to cope with a change with time carried out at the time of shifting up. The description here will be made taking a 2-to-3 shifting as an example. When the shift command signal is changed from second to third, the signal Gf (hereinafter briefly referred to as Gf) obtained by subjecting the longitudinal vehicle acceleration signal to the filtering process is stored as a pre-shift acceleration signal Gs (hereinafter briefly referred to as Gs). Further, a constant Gshift (hereinafter briefly referred to as Gshift) for varying the value Gf for detecting the start of the torque phase is set up. For the sake of accuracy in the detection of the torque phase, the value Gshift needs to be varied depending on the change in the throttle opening θ (hereinafter briefly referred to as θ), namely the magnitude of the engine load.

At the same time, an engaging hydraulic pressure command value HC (hereinafter briefly referred to as HC) is raised and a disengaging hydraulic pressure command value BB (hereinafter briefly referred to as BB) is lowered. The lowered value should be such as to previously establish the value BB that brings the hydraulic pressure very close to the point of disengagement to thereby shorten the disengaging period of the engagement device on the disengaging side. The value is called here a previously held hydraulic pressure command value.

When the torque phase begins, the signal Gf comes to agree with the value Gs having less Gshift at the point of the signal Gf indicated by the hollow circle in the chart. At this point of time, the value BB is lowered stepwise to cause the engagement device on the disengaging side to disengage. Thus, an effective disengaging hydraulic pressure BB is brought virtually concurrent with the hollow circled point at the end of the torque phase and a good shifting characteristic can be obtained.

Then, the signal Gf sharply rises at the beginning of the inertia phase and, thereafter, it gently rises at a value determined by the hydraulic pressure supplied to the friction engagement device on the engaging side and the capacity of the engagement device. When a change with time has occurred in the engagement device, such a phenomenon takes place in which the signal Gf gently rises at the beginning of the inertia phase and then sharply rises as indicated by the broken line. Therefore, by using the differential value dGf/dt of GF at the beginning of the inertia phase, the change with time of the engagement device can be detected. More particularly, when the value dGf/dt at the beginning of the inertia phase in FIG. 3 is smaller than the previously stored reference level for determining existence of a change with time, it is determined that a change with time exists in the engagement device.

Figure 4:
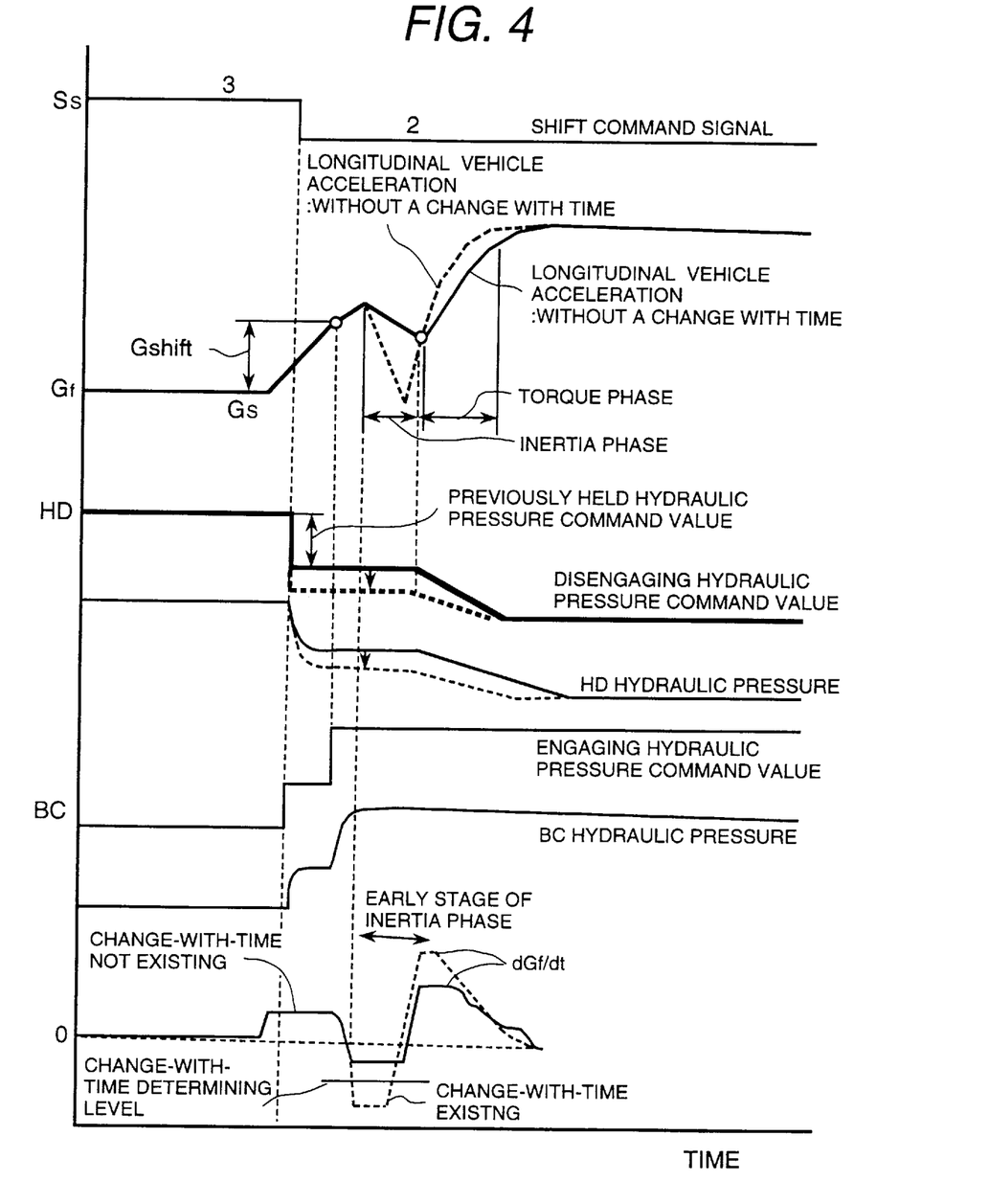
FIG. 4 is a time chart of control to cope with existence of a change with time carried out at the time of downshift control.

FIG. 4 is a time chart of control to cope with a change with time carried out at the time of shifting down. The description here will be made taking 3-to-2 shifting as an example. Before the shift command signal is changed from third to second, the value Gf is stored as the value Gs. Further, the value Gshift for detecting the stage prior to the start of the inertia phase is established. The value Gshift needs to be varied depending on the change of θ, i.e., on the magnitude of the engine load. Thereafter, it is determined whether or not a shift command signal has been issued and, when it has been issued, a disengaging hydraulic pressure command value HD (hereinafter briefly referred to as HD) is lowered. The lowered value is previously obtained by matching. Further, an engaging hydraulic pressure command value BC (hereinafter briefly referred to as BC) is raised. The raised value should be such as to previously establish the value BC that brings the hydraulic pressure very close to the point of engagement to thereby shorten the engaging period of the engagement device on the engaging side. This value also varies with Toil and θ.

When the stage prior to the start of the inertia phase is approached, the value Gf comes to agree with the value Gs plus Gshift and the value BC is raised stepwise to cause the engagement device on the engaging side to engage. Thus, an effective engaging hydraulic pressure BC can be brought virtually concurrent with the hollow circled point at the beginning of the inertia phase and a good shifting characteristic can be obtained. The value HD is kept constant during the period of the inertia phase so that the lowering rate of the value Gf after the inertia phase has started becomes small.

When the inertia phase begins, the value Gf falls gently and then, after the torque phase has begun, it rises sharply and the shifting is ended. Here, when a change with time has occurred in the engagement device, such an phenomena occurs in which Gf sharply falls at the stage following the beginning of the inertia phase as indicated by the broken line. Therefore, the change with time of the engagement device can be detected by using the differential value dGf/dt of the value Gf at the time when the inertia phase has occurred. More particularly, when the value dGf/dt at the beginning of the inertia phase shown in FIG. 4 is smaller than the previously stored constant for determining existence of a change with time, it is determined that a change with time exists in the engagement device.

Figure 5:
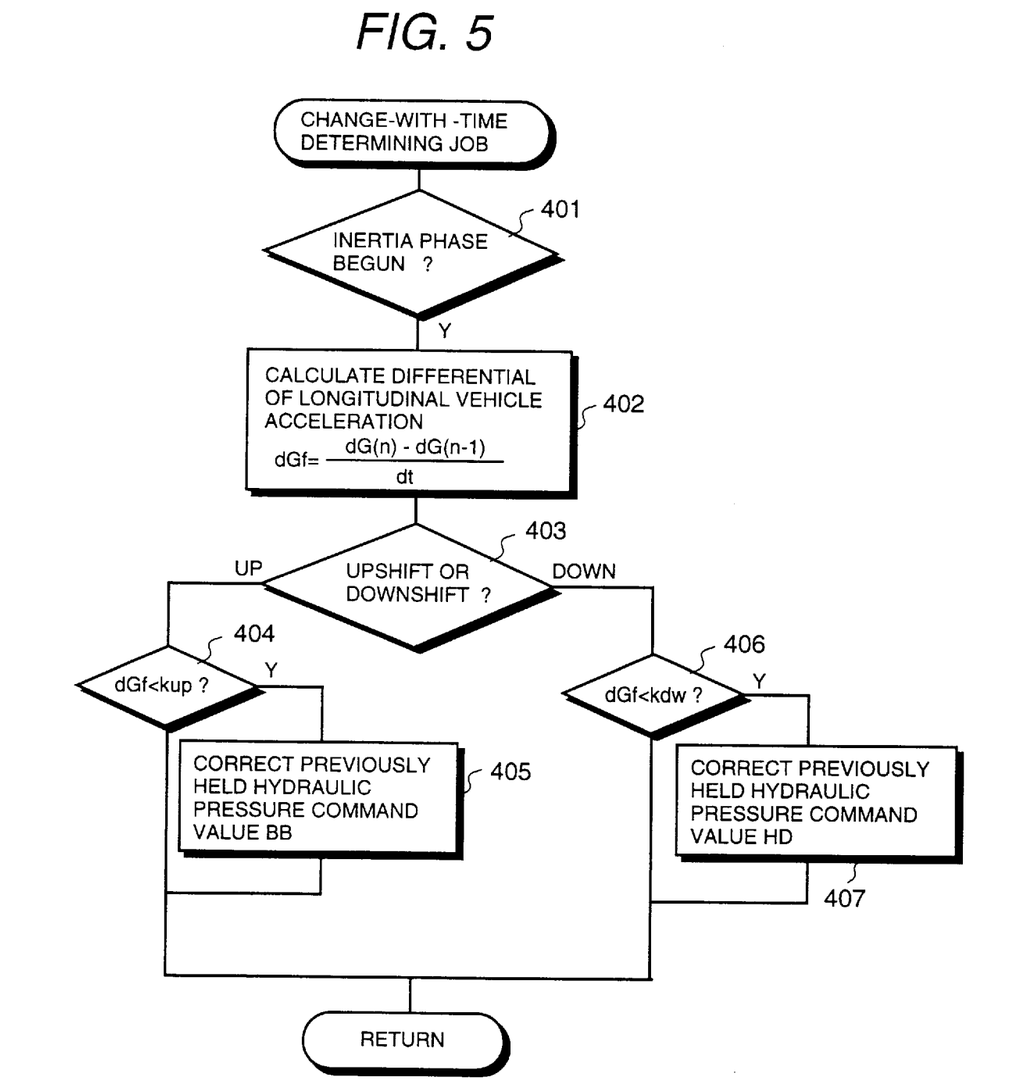
FIG. 5 is a control flowchart for determining occurrence of a change with time.

FIG. 5 is a control flowchart of the first embodiment. First, in step 401, it is determined by using the acceleration signal G whether or not the state of shifting at the moment is that of the beginning of an inertia phase. If the result is yes, the control advances to step 402, and therein the differential dGf (hereinafter briefly referred to as dGf) of the longitudinal vehicle acceleration is calculated. Then, in step 403, it is determined whether the shift command signal is for upshift or downshift. If the command signal is for upshift, the control advances to step 404. In step 404, it is determined whether the value dGf is smaller than a constant kup for determining existence of a change with time. If the result is yes, it is determined that a change with time exists and the control advances to step 405. In step 405, correction is made so that the previously held hydraulic pressure command value of the disengaging hydraulic pressure command value BB is decreased and this corrected value is used at the shifting next time.

When the command signal determined in step 403 is for downshift, the control advances to step 406. In step 406, it is determined whether the value dGf is smaller than a constant kdw for determining existence of a change with time. If the result is yes, it is determined that a change with time exists and the control advances to step 407. In step 407, correction is made so that the previously held hydraulic pressure command value of the disengaging hydraulic pressure command value HD is decreased and this corrected value is used at the shifting next time.

Figure 6:
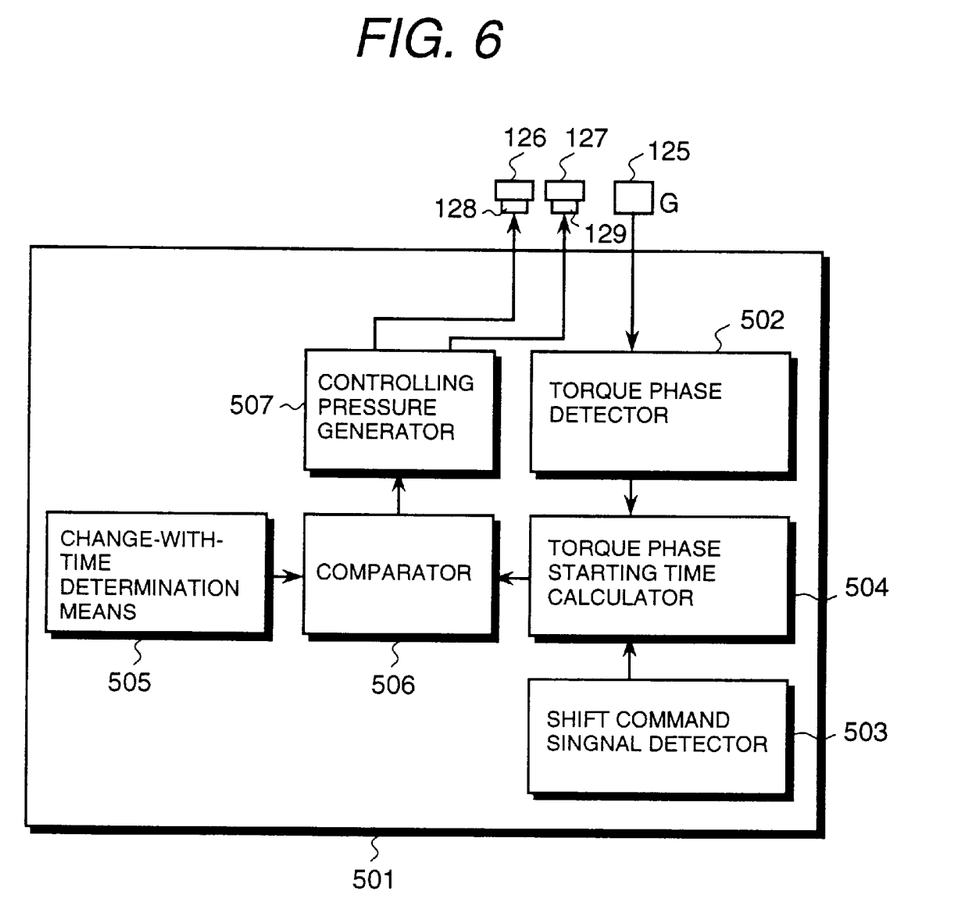
FIG. 6 is a system block diagram of a second embodiment of the present invention.

FIG. 6 to FIG. 9 show a second embodiment of the present invention. FIG. 6 is a system block diagram similar to FIG. 1, but illustrations of the engine 101 and the automatic transmission 130 are omitted for simplicity.

A torque phase detector 502 within a controller 501 performs digital processing and filtering processing of the acceleration sensor 125 and detects the torque phase in a shifting operation by using the filtering value Gf. A shift command signal detector 503 checks the shift command signal from the automatic transmission 130 and detects a shift pattern (for example, shifting up from second to third).

A torque phase starting time calculator 504 calculates the period of time from the time when a change in the shift command is detected in the shift command signal detector to the time when it is detected in the torque phase detector that the torque phase has started, i.e., a torque phase starting time Ttq (hereinafter referred to as Ttq). Because the detected torque phase starting time varies, or, more particularly, becomes longer, when a change with time has occurred in the friction engagement device on the engaging side, it becomes possible to determine that a change with time has occurred in the friction engagement device by using the value of the torque phase starting time.

A change-with-time determination apparatus 505 stores therein a constant of reference level obtained through previously conducted experiments for determining existence of a change with time. This constant is compared with the time obtained by the torque phase starting time calculator 504 in a comparator 506 for determining whether or not a change with time exists. If it is determined, in the case of upshift, in the comparator 506 that a change with time exists, a previously held hydraulic pressure command value (described later) for controlling the hydraulic pressure to be supplied to the friction engagement device on the engaging side (here, it is assumed that 2-to-3 shifting is being carried out) should be raised so that the friction engagement device on the engaging side 123 can easily engage. Then, a controlling pressure generator 507 outputs the raised controlling pressure command value to the linear solenoid 128.

Also in the case of shifting down, a change with time can be detected by a similar method. In the case of shifting down, however, the engaging and disengaging sides of the friction engagement devices in the upshift case are exchanged.

Figure 7:
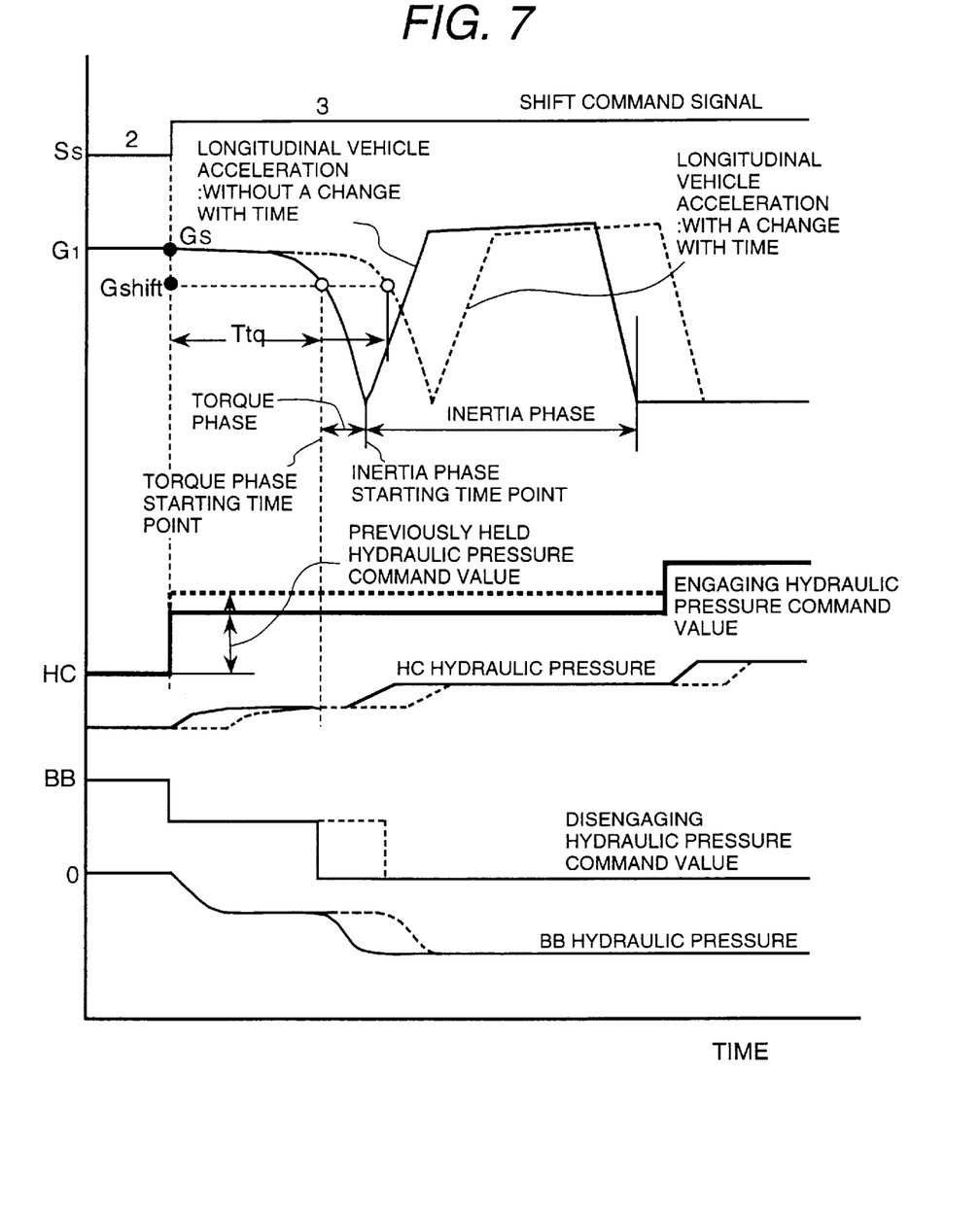
FIG. 7 is a time chart of control to cope with existence of a change with time carried out at the time of upshift control.

FIG. 7 is a time chart of control to cope with existence of a change with time of the friction engagement device on the engaging side carried out at the time of shifting up. Here, description will again be made taking a case of 2-to-3 shifting as an example.

When the value Ss is changed from second to third, the value Gf is stored as a pre-shift acceleration signal Gs (hereinafter briefly referred to as Gs), a constant Gshift (hereinafter briefly referred to as Gshift) for varying the value Gf for detecting the start of the torque phase is established, and the values HC and BB are set to the previously held standby hydraulic pressure command values. The time at this point is set to 0. After the torque phase has started, the value Gf reaches the value Gs plus Gshift at the hollow circled point of the value Gf in the chart and the value BB for causing the friction engagement device on the disengaging side to disengage is lowered stepwise. The time at this point is stored as a torque phase starting time Ttq (hereinafter briefly referred to as Ttq). Thus, the effective disengaging hydraulic pressure BB is brought virtually concurrent with the hollow circled point at the end of the torque phase and a good shifting characteristic can be obtained.

When a change with time has occurred in the friction engagement device on the engagement side, the hydraulic pressure HC does not rise and, therefore, the start of the torque phase is delayed as indicated by the broken line and, as a result, the time Ttq becomes longer. Therefore, detection of a change with time in the friction engagement device becomes possible by using the torque phase starting time. More particularly, when the time Ttq shown in FIG. 7 becomes greater than the reference level for determining existence of a change with time, it is determined that a change with time exists in the friction engagement device.

When it is determined that a change with time exists as the result of the determination, correction is made so that the previously held hydraulic pressure value command for the pressure HC is increased by a fixed amount in the 2-to-3 shifting next time.

Figure 8:
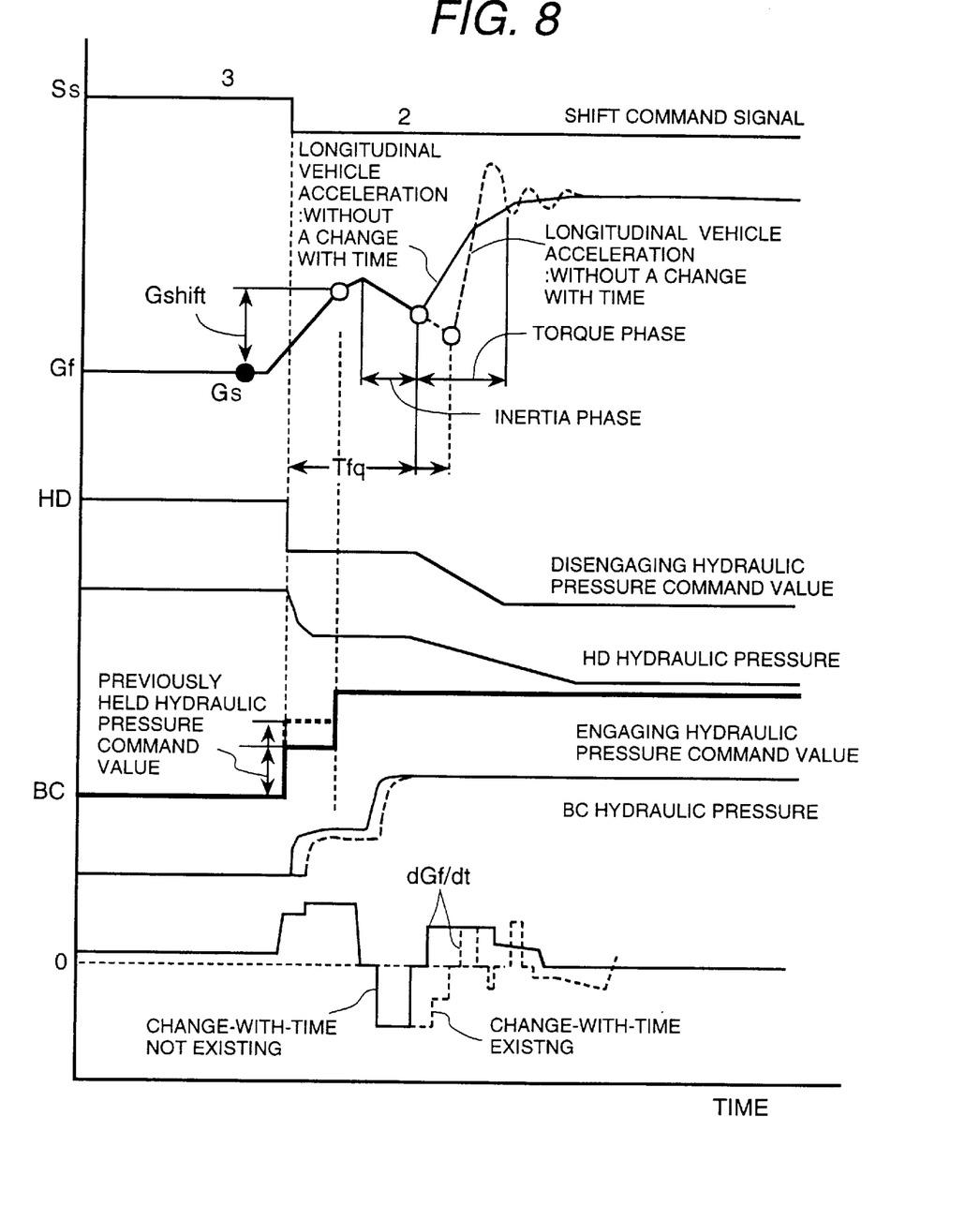
FIG. 8 is a time chart of control to cope with existence of a change with time carried out at the time of downshift control.

FIG. 8 is a time chart of control to cope with existence of a change with time at the time of shifting down. Here, description will be made taking a case of 3-to-2 shifting as an example. The value Gf is stored as the value Gs before the shift command signal changes from third to second. Then, it is determined whether or not a shift command is generated. When it is generated, the value HD is lowered and the value BC is raised. The time at this point is set to 0.

When the stage prior to the start of the inertia phase is approached, the value Gf comes to agree with the value GS plus Gshift at the hollow circled point in the chart of the value Gf and the value BC for causing the friction engagement device on the engagement side to engage is raised stepwise. Thereby, the effective hydraulic pressure BC is brought virtually concurrent with the hollow circled point at the stage prior to the start of the inertia phase and a good shifting characteristic can be obtained. Meanwhile, the value HD in the inertia phase is kept constant so that the rate of fall of the value Gf after the start of the inertia phase becomes smaller. After the start of the inertia phase, the value Gf gently falls until the torque phase is started. At this point, the differential dGf/dt (hereinafter briefly referred to as dGf/dt) of the longitudinal vehicle acceleration is inverted from a negative value to a positive value, whereby the starting time point of the torque phase is detected. The time at this point is stored as Tqf.

When a change with time has occurred in the engagement device, the hydraulic pressure BC does not rise as indicated by the broken line. Therefore, the start of the torque phase is delayed as indicated by the broken line and the time Ttq is prolonged. Therefore, the same as in the case of the above described shifting up, it becomes possible to detect a change with time in the friction engagement device on the engagement side also in this case of shifting down. More specifically, when the time Ttq indicated in FIG. 8 becomes greater than the previously stored reference level for determining existence of a change with time, it is determined that a change with time exists in the friction engagement device.

When it is found that a change with time has occurred as the result of the determination, correction is made so that the previously held hydraulic pressure value command for the pressure BC is increased by a fixed quantity in the 3-to-2 shifting next time.

Figure 9:
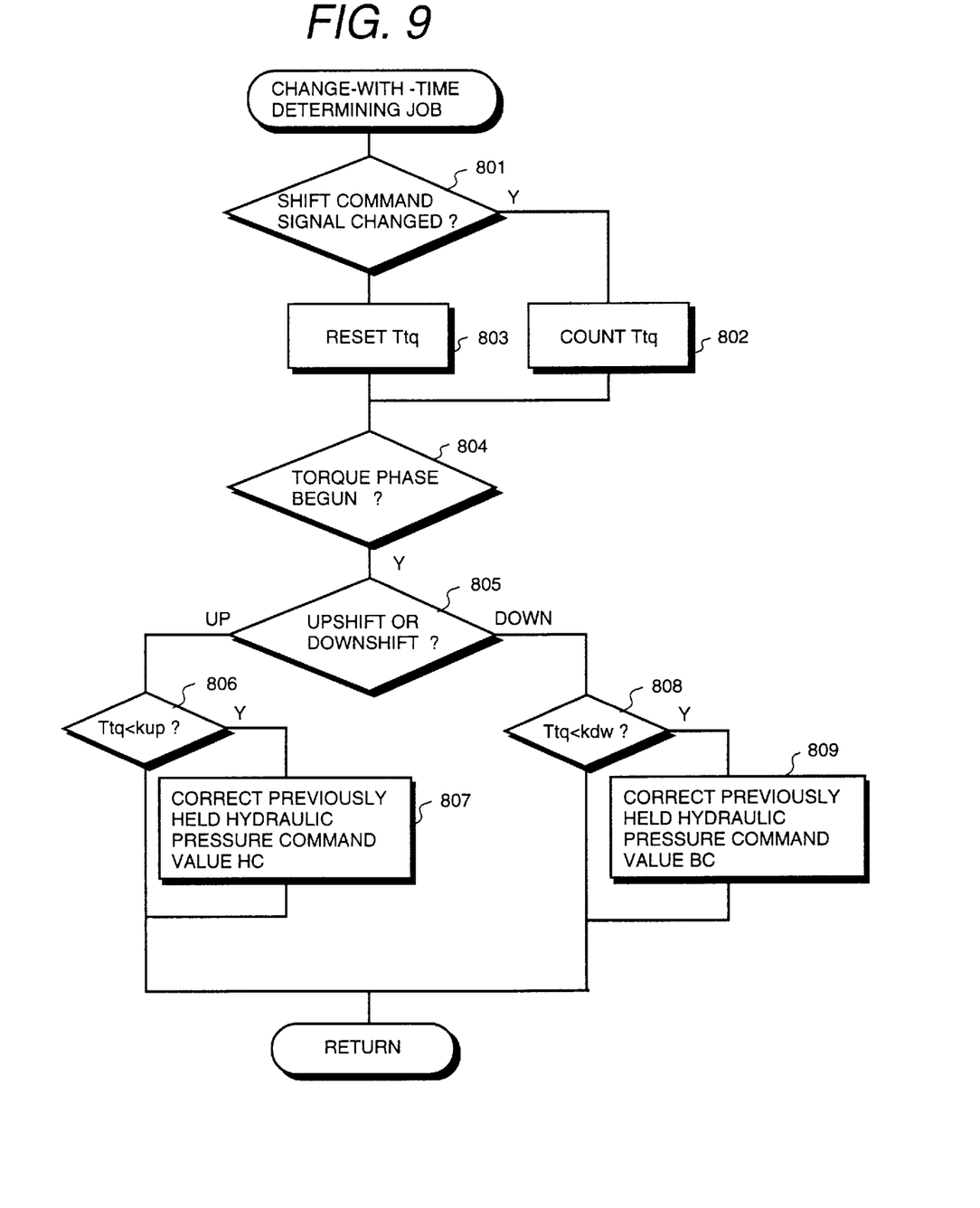
FIG. 9 is a control flowchart for determining occurrence of a change with time.

FIG. 9 is a control flowchart of the second embodiment. First, in step 801, it is determined whether or not the shift command signal has been changed. When the result is yes, the control advances to step 802 and the torque phase starting time Ttq is reset and, when the result is no, the control advances to step 803 and the time Ttq is counted therein.

Then, in step 804, it is determined whether the torque phase has started by using the value of the longitudinal vehicle acceleration. When the result of the decision is yes, the control advances to step 805. In step 805, it is determined whether the shift command signal is that for shifting up or shifting down. If the shift command signal is that for shifting up, the control advances to step 806. In step 806, it is determined whether or not the time Ttq is greater than the reference level kup for determining existence of a change with time. When the result is yes, it is determined that a change with time exists and the control advances to step 807.

In step 807, correction is made to increase the previously held hydraulic pressure command value for the disengaging hydraulic pressure command value HC, and this corrected value is used at the time of shifting next time.

In step 805, if the command signal is that for shifting down, the control advances to step 808. In step 808, it is determined whether or not the time Ttq is greater than the reference level kdw for determining occurrence of a change with time, and, when the result is yes, it is determined that a change with time exists and the control advances to step 809. In step 809, correction is made so that the previously held hydraulic pressure command signal value for the disengaging hydraulic pressure command value BC is increased and this value is used in the 3-to-2 shifting next time.

By virtue of the above described arrangements, a change with time in the friction engagement device can be detected by simple methods and, hence, an unnecessary increase in the capacity of the ROM in the microcomputer can be avoided. Further, since fluctuations in the torque can be suppressed even when a change with time has occurred in the friction engagement device, it is made possible to provide a transmission controlling apparatus and controlling method whereby comfortable acceleration feeling is continuously obtained.

According to the present invention, it is made possible to provide an apparatus for controlling transmission and method of controlling transmission whereby, even when a change with time has occurred in the friction engagement device of the automatic transmission, fluctuations in the torque are suppressed without the need for increasing the capacity of ROM in the microcomputer and comfortable acceleration feeling is continuously obtained.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control apparatus for controlling a vehicle automatic transmission configured to transmit an increased or decreased engine speed outputted to a drive shaft in a vehicle and to change a transmission gear ratio, including a plurality of friction engagement devices configured to turn on or off transmitting the outputted engine speed by engagement or disengagement of friction transmitting mechanisms, a hydraulic circuit configured to effect the vehicle speed changing with change of the transmission gear ratio by causing at least one friction transmitting mechanism of said friction engagement devices to engage and causing at least one friction transmitting mechanism of the remaining friction engagement devices to disengage, and pressure control command generator configured to generate a pressure control command value to control the hydraulic pressure to be supplied to said hydraulic circuit for effecting disengagement of the friction transmitting mechanism of said friction engagement device at the time of the vehicle speed changing, the control apparatus comprising:

an acceleration detector configured to detect a longitudinal vehicle acceleration;

an inertia phase detector configured to detect, in the period from the start to the end of the vehicle speed changing, an inertia phase by using a variation in the acceleration, said inertia phase following a torque phase;

a torque variation calculator configured to calculate a coefficient value of the torque variation of the drive shaft from the value of the acceleration in the inertia phase;

memory configured to store a predetermined constant value of the torque variation of the drive shaft in the inertia phase; and a comparator configured to compare the coefficient value of torque variation with stored constant value to determine when said friction engagement device is in a changed state over time to cause said pressure control command generator to output the pressure control command value.

2. A control apparatus for controlling an automatic transmission according to claim 1, wherein said pressure control command value is a command value for varying the hydraulic pressure supplied to said friction engagement device before said friction transmitting mechanism is disengaged.

3. A control method for a vehicle automatic transmission configured to transmit an increased or decreased engine speed outputted to a drive shaft of a vehicle, and to change a transmission gear ratio, including a plurality of friction engagement devices configured to turn on or off transmitting the outputted engine speed by engagement or disengagement of friction transmitting mechanisms, a hydraulic circuit configured to effect the vehicle speed changing with change of the transmission gear ratio by causing at least one friction transmitting mechanism of said friction engagement devices to engage and causing at least one friction transmitting mechanism of the remaining friction engagement devices to disengage, and a pressure control command generator configured to generate a pressure control command value to control the hydraulic pressure to be supplied to said hydraulic circuit for effecting disengagement of the friction transmitting mechanism of said friction engagement device at the time of the vehicle speed changing, comprising the steps of:

detecting a longitudinal vehicle acceleration;

detecting, in the period from the start to the end of the speed changing, an inertia phase by using a variation in the detected acceleration;

calculating a coefficient value of the torque variation of the drive shaft from the value of the acceleration in the inertia phase;

comparing a stored predetermined value of the torque variation of the drive shaft in the inertia phase with the coefficient value of torque variation to determine when said friction engagement device is in a changed state over time to cause said pressure control command generator to output the pressure control command value.

4. A control method for controlling an automatic transmission according to claim 3, wherein said pressure control command value is a command value for varying the hydraulic pressure supplied to said friction engagement device before said friction transmitting mechanism is disengaged.

* * * * *